(12) United States Patent
Matsunaga et al.

(10) Patent No.: US 11,669,217 B2
(45) Date of Patent: Jun. 6, 2023

(54) INFORMATION PROCESSING APPARATUS

(71) Applicant: NTT DOCOMO, INC., Chiyoda-ku (JP)

(72) Inventors: Yuki Matsunaga, Chiyoda-ku (JP); Aya Murakami, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 17/435,065

(22) PCT Filed: Mar. 4, 2020

(86) PCT No.: PCT/JP2020/009088
§ 371 (c)(1),
(2) Date: Aug. 31, 2021

(87) PCT Pub. No.: WO2020/179813
PCT Pub. Date: Sep. 10, 2020

(65) Prior Publication Data
US 2022/0164087 A1 May 26, 2022

(30) Foreign Application Priority Data
Mar. 5, 2019 (JP) .............................. JP2019-039466

(51) Int. Cl.
*G06F 3/04812* (2022.01)
*G06F 3/04842* (2022.01)
(Continued)

(52) U.S. Cl.
CPC .......... *G06F 3/04812* (2013.01); *G06F 3/017* (2013.01); *G06F 3/0482* (2013.01); *G06F 3/04817* (2013.01); *G06F 3/04842* (2013.01)

(58) Field of Classification Search
None
See application file for complete search history.

(56) References Cited

U.S. PATENT DOCUMENTS 8,386,927 B1 * 2/2013 Franklin ............... G06F 3/0488
715/857
8,516,369 B2 * 8/2013 Yoo ..................... G06F 3/04812
715/702

(Continued)

FOREIGN PATENT DOCUMENTS

JP       10-198519 A       7/1998
JP     2001125703 A  *    5/2001

OTHER PUBLICATIONS

International Search Report dated May 26, 2020 in PCT/JP2020/009088 filed on Mar. 4, 2020 (2 pages).

*Primary Examiner* — Linda Huynh
(74) *Attorney, Agent, or Firm* — Oblon, McClelland, Maier & Neustadt, L.L.P.

(57) ABSTRACT

An information processing apparatus (10) includes a receiver (111) configured to receive operation information corresponding to details of a cursor operation of allowing a user (U) to move the cursor (CUR); a controller (112) configured to cause a display (20) to display the cursor (CUR), based on the operation information, and a calculator (114) configured to, when the operation information includes an instruction to move the cursor positioned in one item image out of the item images (GI-1 to GI-9) toward another item image adjacent to the one item image, calculate an arrangement density of item images arranged in a direction of movement of the cursor from the one item image. The controller (112) reduces an amount of the cursor operation required for the user to move the cursor (CUR) from the one item image to the other item image to be within a range not below a predetermined lower limit value as the arrangement density calculated by the calculator (114) increases.

7 Claims, 9 Drawing Sheets

(51) Int. Cl.
*G06F 3/04817* (2022.01)
*G06F 3/0482* (2013.01)
*G06F 3/01* (2006.01)

(56) References Cited

U.S. PATENT DOCUMENTS

| | | | | |
|---|---|---|---|---|
| 2003/0043213 A1* | 3/2003 | Finley, Jr. | G06F 3/04892 | 715/856 |
| 2003/0210227 A1* | 11/2003 | Smith | G06F 3/013 | 345/157 |
| 2005/0237300 A1* | 10/2005 | Baudisch | G06F 3/04812 | 345/158 |
| 2007/0176900 A1* | 8/2007 | Nagar | G06F 3/04812 | 345/159 |
| 2008/0244462 A1* | 10/2008 | Kim | G06F 3/0346 | 715/856 |
| 2009/0015550 A1* | 1/2009 | Koski | G06F 3/04812 | 345/157 |
| 2009/0015557 A1* | 1/2009 | Koski | G06F 3/016 | 345/157 |
| 2009/0027337 A1* | 1/2009 | Hildreth | G06F 3/017 | 345/158 |
| 2009/0031257 A1* | 1/2009 | Arneson | G06F 3/04812 | 715/862 |
| 2010/0169773 A1* | 7/2010 | Yoo | G06F 3/0481 | 715/702 |
| 2013/0132912 A1* | 5/2013 | Kim | G06F 3/04812 | 715/857 |
| 2013/0145326 A1* | 6/2013 | Kim | G06F 3/04883 | 715/862 |
| 2014/0201666 A1* | 7/2014 | Bedikian | G06V 40/20 | 715/771 |
| 2015/0261408 A1* | 9/2015 | Ostergren | G06F 3/04812 | 345/163 |
| 2019/0377487 A1* | 12/2019 | Bailey | G06F 1/163 | |

* cited by examiner

INFORMATION PROCESSING APPARATUS

TECHNICAL FIELD

The present invention relates to information processing apparatuses.

BACKGROUND ART

In an information processing apparatus using a graphical user interface (GUI), for example, as disclosed in Patent Document 1, an item image such as a button is selected using a pointer. Patent Document 1 discloses that a technology in which, when a pointer enters a specific region around a button on a display screen, operating speed of the pointer increases, and otherwise, when the pointer exits the specific region, operating speed of the pointer decreases.

RELATED ART DOCUMENT

Patent Document

Patent Document 1: Japanese Patent Application Laid-Open Publication No. H10-198519

SUMMARY OF THE INVENTION

Problem to be Solved by the Invention

In the technology described in Patent Document 1, the deceleration of the above pointer is constant, regardless of how many, if any, buttons are arranged between the selected button and a button desired to be selected. Therefore, in the technology described in Patent Document 1, when the number of buttons arranged between the selected button and the button desired to be selected increases, since the amount of input operation required for the pointer to transition to the button desired to be selected is too large, there is a problem of deteriorating operability.

Means of Solving the Problems

In order to address the above problems, an information processing apparatus according to an preferable aspect of the present invention is an information processing apparatus that displays item images and a cursor on a display, the information processing apparatus including: a receiver configured to receive operation information corresponding to details of a cursor operation of allowing a user to move the cursor; a controller configured to cause the display to display the cursor, based on the operation information; and a calculator configured to, when the operation information includes an instruction to move the cursor positioned in one item image out of the item images toward another item image adjacent to the one item image, calculate an arrangement density of item images arranged in a direction of movement of the cursor from the one item image, in which the controller is configured to reduce an amount of cursor operation required for the user to move the cursor from the one item image to the another item image to be within a range not below a predetermined lower limit value as the arrangement density calculated by the calculator increases.

Effect of the Invention

According to the information processing apparatus of the present invention, as the arrangement density of item images in the direction of movement of the cursor increases, an amount of input operation of the cursor operation required for the cursor to move from one item image to another item image is reduced to be within a range not below a predetermined lower limit value. Therefore, even if the number of item images arranged before the item image desired to be selected increases, the amount of input operation performed by the user is reduced to be within a predetermined range, and as a result, the operability is improved.

MODES FOR CARRYING OUT THE INVENTION

1. First Embodiment

1.1. Overview of System Using Information Processing Apparatus

Figure 1:
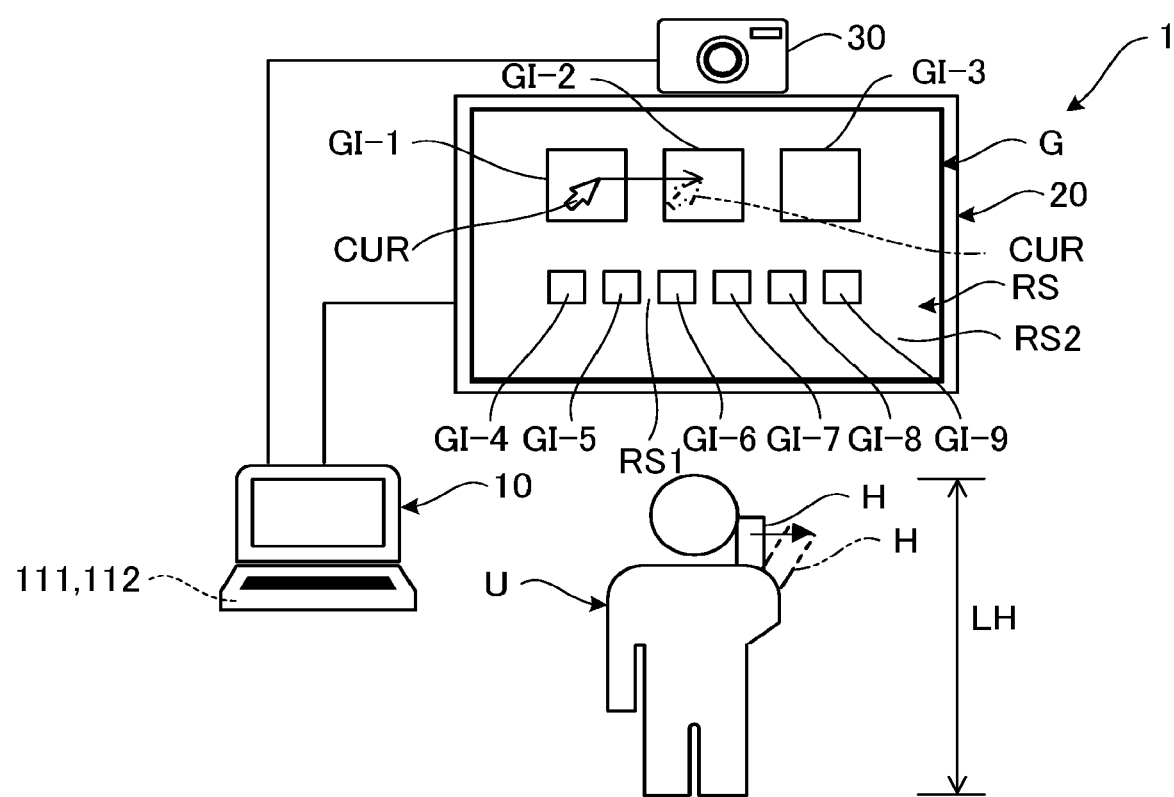
FIG. 1 is an exemplary diagram illustrating an appearance of a configuration example of a system using an information processing apparatus according to a first embodiment.

FIG. 1 is a diagram schematically illustrating an appearance of a configuration example of a system 1 using an information processing apparatus 10 according to a first embodiment. The system 1 illustrated in FIG. 1 performs various types of information processing using a graphical user interface. In the present embodiment, an information processing apparatus configured to perform an input operation by movement (gesture) of a user U's hand H is described.

As illustrated in FIG. 1, the system 1 includes the information processing apparatus 10, a display 20, and an imaging device 30. The information processing apparatus 10 is a computer device having a configuration, which will be described below in detail. FIG. 1 exemplifies a case in which the information processing apparatus 10 is a laptop computer. The information processing apparatus 10 is not limited to the laptop computer, and may be, for example, a desktop computer, a smartphone or a tablet. In addition, the information processing apparatus 10 may be configured by using ready-made hardware or may be configured by using dedicated hardware.

Various types of display panels, such as a liquid crystal display panel and an organic electroluminescence (EL) display panel, may be used for the display 20. The display 20 may be a projector that projects image light on a screen and displays an image, or it may be a head-mounted display or a head-up display.

The imaging device 30 captures images of the user U and outputs data indicative of the captured image. The captured image is constituted, for example, by pixels which are arranged in a matrix. The data includes information on luminance or the like for each pixel of the captured image. The imaging device 30 includes, for example, an imaging optical system and an imaging element. The imaging optical system is an optical system including at least one imaging lens, and it may include various optical elements such as a prism, and may include a zoom lens, a focus lens, and the like. The imaging element is composed of, for example, a charge coupled device (CCD) image sensor, a complementary MOS (CMOS) image sensor, or the like. In the example illustrated in FIG. 1, the imaging device 30 is installed above the display 20. The installation position of the imaging device 30 is not limited to the example illustrated in FIG. 1 and may be freely selected as long as it can capture an image of a user U.

In the system 1, the information processing apparatus 10 causes the display 20 to display an image G including item images GI-1 to GI-9 and a cursor CUR. The information processing apparatus 10 receives an input operation made by the user U, based on the data from the imaging device 30 and moves the cursor CUR. For example, when the hand H moves from a position indicated by a solid line in FIG. 1 to a position indicated by a two-dot dashed line, the cursor CUR moves from a position indicated by a solid line (the item image GI-1) in FIG. 1 to a position indicated by a two-dot dashed line (the item image GI-2). In the following description, when the item images GI-1 to GI-9 do not need to be distinguished from each other, each of the item images GI-1 to GI-9 is also referred to as "item image GI". The image G includes the item images GI-1 to GI-9 and the cursor CUR, and also a region RS other than the item images GI-1 to GI-9. The region RS includes a region RS1 between the item images GI-1 to GI-9 and a circular region RS2 that surrounds the entire set composed of the item images GI-1 to GI-9.

The information processing apparatus 10 calculates an arrangement density of the item image GI in a direction of movement of the cursor CUR. The information processing apparatus 10 reduces an amount of the cursor operation required for the user U to move the cursor CUR between two adjacent item images GI as the arrangement density increases. Therefore, even if the number of item images GI arranged between the selected item image GI and the item image GI to be selected increases, the amount of input operation made by the user U can be restricted to be within a predetermined range. The information processing apparatus 10 adjusts the amount of input operation required for the cursor operation to be within a range not below a predetermined lower limit value. Therefore, even if the distance between two adjacent item images GI is short, unintentional movement of the cursor CUR between the two item images GI is minimized.

1.2. Hardware Configuration of System Using Information Processing Apparatus

Figure 2:
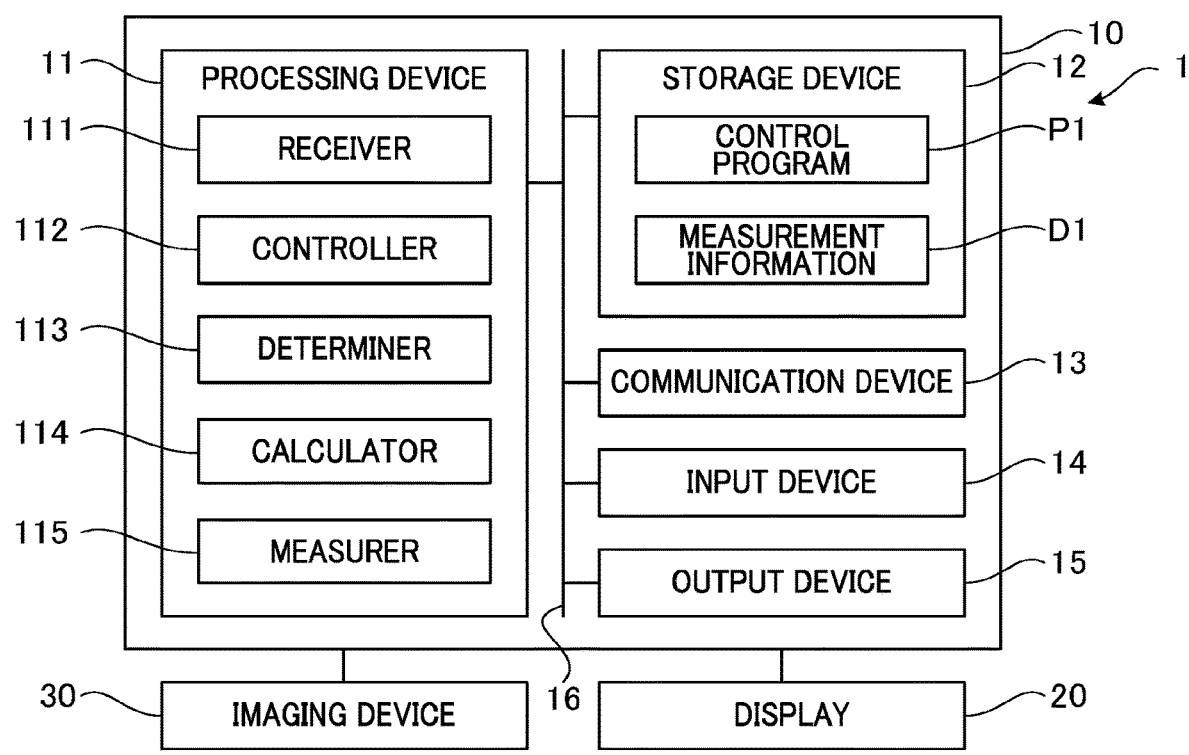
FIG. 2 is a block diagram illustrating a system using the information processing apparatus according to the first embodiment.

FIG. 2 is a block diagram illustrating the system 1 using the information processing apparatus 10 according to the first embodiment. As illustrated in FIG. 2, the information processing apparatus 10 includes a processing device 11, a storage device 12, a communication device 13, an input device 14, an output device 15 and a bus 16 that connects these devices. The bus 16 may be composed of a single bus or may be composed of different buses, depending on the device.

The processing device 11 is a processor that controls the entire information processing apparatus 10, and is composed of, for example, one chip or multiple chips. The processing device 11 is composed of, for example, a central processing unit (CPU) including an interface with peripheral devices, an arithmetic device, a register, and the like. Some or all of the functions of the processing device 11 may be realized by hardware such as a digital signal processor (DSP), an application-specific integrated circuit (ASIC), a programmable logic device (PLD), and a field programmable gate array (FPGA). The processing device 11 executes various processes in parallel or sequentially.

The storage device 12 is a recording medium that can be read by the processing device 11, and stores programs including a control program P1 executed by the processing device 11 and various types of data including measurement information D1 used by the processing device 11. For example, the storage device 12 is composed of one or more components among memory circuits such as a read only memory (ROM), an erasable programmable ROM (EPROM), an electrically erasable programmable ROM (EEPROM), and a random access memory (RAM).

The communication device 13 communicates with other devices. The communication device 13 has a function of communicating with other devices via a network such as a mobile communication network or the Internet and a function of communicating with other devices through short-range wireless communication. Examples of short-range wireless communication include Bluetooth (registered trademark), ZigBee, and WiFi (registered trademark). In the present embodiment, the communication device 13 communicates with each of the above display 20 and imaging device 30.

The input device 14 receives an input from the outside (for example, a keyboard, a mouse, a microphone, a switch, a button, and a sensor). The input device 14 may include the above imaging device 30. The input device 14 may be provided as necessary or may be omitted.

The output device 15 performs output to the outside (for example, to a display, a speaker, or an LED lamp). The output device 15 may be integrated with the input device 14 (for example, a touch panel). The output device 15 may include the above display 20. The output device 15 may be provided as necessary or may be omitted.

1.3. Function of Information Processing Apparatus

The processing device 11 serves as a receiver 111, a controller 112, a determiner 113, a calculator 114 and a measurer 115 by executing the control program P1 read from the storage device 12. Therefore, the information processing apparatus 10 includes the receiver 111, the controller 112, the determiner 113, the calculator 114, and the measurer 115.

The receiver 111 receives operation information corresponding to details of a cursor operation of allowing a user U to move the cursor CUR. The receiver 111 according to this embodiment detects a gesture of the user U on the basis of data from the imaging device 30 and receives operation information corresponding to details of the cursor operation using the gesture. Specifically, the receiver 111 identifies the position of the hand H of the user U from a captured image indicated by data from the imaging device 30, considers movement of the position as the cursor operation of the user U, and outputs a signal including the operation information corresponding to details of the cursor operation. For example, the receiver 111 detects the hand H in a specific state, and receives the operation information in a period in which the hand H is in the specific state. The specific state is not particularly limited, and an example thereof is a state in which the user U holds the palm of the hand H up to the display 20 or the imaging device 30. The position of the hand H is identified, for example, as coordinate values in a two-dimensional coordinate system which is set in the captured image. The operation information is, for example, information indicative of change in the coordinate values in the two-dimensional coordinate system which is set in the captured image. For example, an image processing technique, such as template matching, may be used to detect a gesture in the receiver 111. Determination criteria for detection of a gesture in the receiver 111 may change, for example, depending on results of machine learning or the like.

The controller 112 causes the display 20 to display the item images GI and the cursor CUR. The controller 112 causes the display 20 to display the cursor CUR on the basis of the operation information from the receiver 111. Specifically, the controller 112 changes the position of the cursor CUR in a display area of the display 20 in accordance with, and on the basis of, the following two matters: an amount of input operation to move the cursor based on the operation information from the receiver 111; and a direction of movement of the cursor based on the operation information. For example, when the operation information is information indicative of change in the coordinate values in the two-dimensional coordinate system, the amount of the cursor operation refers to an amount of change (an amount of movement) in the coordinate values. That is, the amount of the cursor operation indicates a distance by which the hand H of the user U has been moved. For example, in a case in which the operation information indicates change in the coordinate values in the two-dimensional coordinate system, the direction of the cursor operation refers to a direction of movement of the coordinate values. Display control of the controller 112 will be described below in detail.

Figure 3:
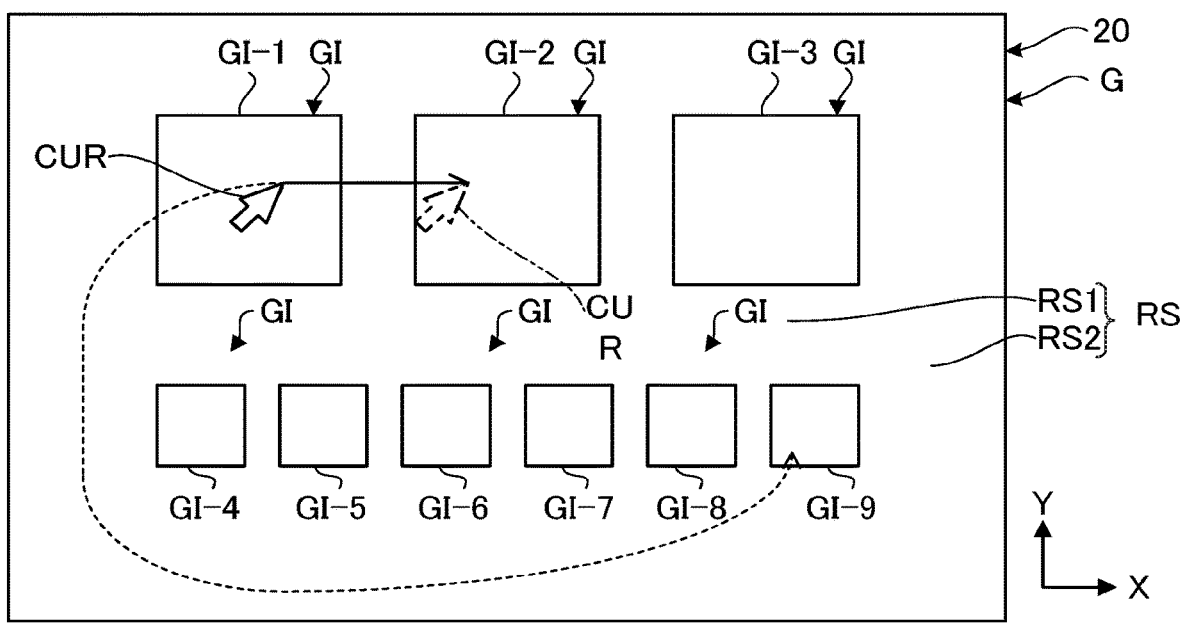
FIG. 3 is a diagram illustrating an example of display on a display in the first embodiment.

FIG. 3 is a diagram illustrating an example of display on the display 20. In the following description, as illustrated in FIG. 3, the horizontal direction of the display region of the display 20 is defined as an X direction, and the vertical direction is defined as a Y direction. As illustrated in FIG. 3, the controller 112 causes the display 20 to display an image G including the item images GI-1 to GI-9 and the cursor CUR. The cursor CUR moves in the image G. The "cursor" may be replaced with a pointer or the like. Each of the item images GI-1 to GI-9 represents, for example, an icon or a button that issues a predetermined instruction when selected with the cursor CUR. The item images GI-1 to GI-9 are arranged at intervals. In FIG. 3, a case is exemplified in which the three item images GI-1 to GI-3 are arranged in the X direction at regular intervals with a first arrangement density, and the six item images GI-4 to GI-9 are arranged in the X direction at regular intervals with a second arrangement density greater than the first arrangement density. The phrase "arrangement density of the item image GI" refers to the number of item images GI arranged per unit length. In FIG. 3, the three item images GI-1 to GI-3 or the six item images GI-4 to GI-9 have the same size and the same shape. The size of each of the three item images GI-1 to GI-3 is larger than the size of each of the six item images GI-4 to GI-9. The shape, size, number, arrangement, and the like of item images GI are not limited to the example in FIG. 3 and may be freely selected. For example, the intervals between the three item images GI-1 to GI-3 or the six item images GI-4 may be unequal.

As described above, the image G includes the item images GI-1 to GI-9 and the cursor CUR, and also the region RS other than the item images GI-1 to GI-9. The region RS includes the region RS1 between the item images GI-1 to GI-9 and the circular region RS2 that surrounds the entire set composed of the item images GI-1 to GI-9. When the cursor CUR is positioned in the region RS, the controller 112 causes the cursor CUR to continuously move according to the movement of the hand H. When the cursor CUR is positioned inside any one item image GI among the item images GI-1 to GI-9, the controller 112 causes the cursor CUR to change its movement depending on the direction of movement of the cursor CUR based on the result of determination made by the determiner 113. When the operation information from the receiver 111 includes an instruction to move the cursor CUR from the inside to the outside of one item image GI out of the item images GI-1 to GI-9, the determiner 113 determines whether there is another item image GI within a predetermined distance D from the one item image GI, the other item image GI being in the direction of movement of the cursor CUR.

Figure 4:
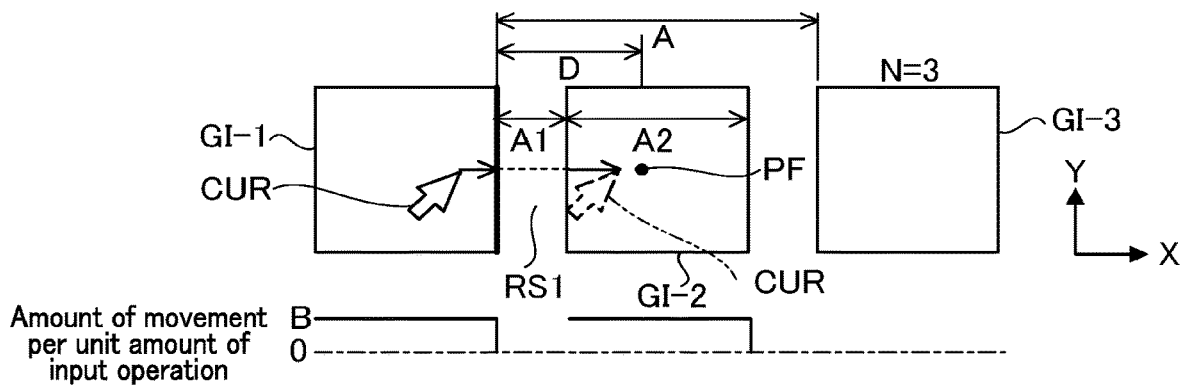
FIG. 4 is a diagram for explaining a case in which there is another item image in a direction of movement of a cursor with respect to a selected item image.

FIG. 4 is a diagram for explaining a case in which the cursor CUR moves from one selected item image GI-1 to another item image GI-2. In the case illustrated in FIG. 4, since there is another item image GI-2 within the predetermined distance D from the item image GI-1, the other item image GI-2 being in the direction of movement of the cursor CUR (positive direction of X), the result of determination made by the determiner 113 is affirmative. For example, the determiner 113 determines whether an outer edge of another item image GI crosses a segment, the segment connecting to a position PF separated the predetermined distance D from the item image GI-1 and the position PF being in the direction of movement of the cursor CUR.

When the result of determination made by the determiner 113 is affirmative, the controller 112 causes the cursor CUR to skip over the region RS1 and move to the inside of the item image GI-2. That is, when there is another item image GI-2 within the predetermined distance D from the selected item image GI-1, the other item image GI-2 being in the direction of movement of the cursor CUR, the controller 112 causes the cursor CUR to move to the other item image GI-2 without passing through the region RS. Therefore, it is possible to avoid a state in which neither the one item image GI nor the other item image GI is selected with the cursor CUR. Since the item images GI are arranged at intervals, compared to when the item images GI are arranged in contact with each other, the user U visually confirms with ease which one of the one item image GI and the other item image GI is selected with the cursor CUR.

The predetermined distance D is any distance that is equal to or greater than a distance L1 between the item image GI-1 and the item image GI-2 and is equal to or smaller than a maximum value that can be obtained in the display region of the display 20. The predetermined distance D may be equal to or greater than the distance L1, and the position PF is not limited to the position illustrated in FIG. 4. For example, when the predetermined distance D is set to any distance that is equal to or greater than a distance between two item images GI that are adjacent to each other at the longest distance via the region RS1 out of the item images GI, it is possible to move the cursor CUR that skips over the region RS1 between two item images GI that are diagonally adjacent to each other. In FIG. 4, a case is exemplified in which the number of other item images GI within the predetermined distance D is one. However, the number of other item images GI within the predetermined distance D may be multiple. In this case, the controller 112 designates the item image GI closest to the selected item image GI among the item images GI within the predetermined distance D as a movement destination of the cursor CUR. The predetermined distance D may be fixed or variable. When the predetermined distance D is variable, for example, the predetermined distance D may change according to the direction of movement of the cursor CUR.

The determiner 113 of the present embodiment determines whether there is another item image GI within the predetermined distance D and the amount of input operation indicating the degree of cursor operation in the receiver 111 is a predetermined amount or more. Therefore, when the result of determination made by the determiner 113 is affirmative, the controller 112 causes the cursor CUR to move in the inside of the item image GI-1 according to the amount of input operation for the operation information from the receiver 111. In this case, when the cursor CUR reaches the outer edge of the item image GI-1 (a side indicated by a thick line in FIG. 4), when the result of determination made by the determiner 113 is affirmative, the controller 112 causes the cursor CUR to stop, not moving while it is in contact with the outer edge of the item image GI-1. This provides the user U with a feeling of input operation in which it is difficult to separate the cursor CUR from the selected item image GI-1. When the cursor CUR is positioned inside the item image GI, when the result of determination made by the determiner 113 is affirmative, the controller 112 may cause the cursor CUR to stop at a predetermined position (for example, the center) inside the item image GI-1 without moving.

The controller 112 determines a reference value (the predetermined amount) used for the above determiner 113 to determine whether the amount of input operation is a predetermined amount or more based on the result of calculation made by the calculator 114. In this manner, the controller 112 adjusts the amount of cursor operation in the receiver 111 required for the cursor CUR to move from one selected item image GI-1 to another adjacent item image GI-2 based on the result of calculations by the calculator 114.

When the operation information from the receiver 111 includes an instruction to move the cursor CUR positioned in one item image GI out of the item images GI-1 to GI-9 toward another item image GI adjacent to the one item image GI, the calculator 114 calculates an arrangement density of the item images GI arranged in the direction of movement of the cursor CUR from the one item image GI out of the item images GI-1 to GI-9. The controller 112 reduces the required amount of cursor operation in the receiver 111 as the arrangement density calculated by the calculator 114 increases. Therefore, even if the number of item images GI arranged before the item image GI desired to be selected increases, the amount of input operation made by the user U is restricted to be within a predetermined range.

The controller 112 adjusts the required amount of cursor operation in the receiver 111 to be within a range not below a predetermined lower limit value. Therefore, even if the distance between two adjacent item images GI is short, unintentional movement of the cursor CUR between the two item images GI is minimized. The controller 112 of the present embodiment determines whether the arrangement density calculated by the calculator 114 is a predetermined density or less. Then, when the arrangement density is a predetermined density or less, the controller 112 reduces the required amount of cursor operation in the receiver 111 as the arrangement density calculated by the calculator 114 increases. On the other hand, when the arrangement density exceeds the predetermined density, the controller 112 sets the above predetermined lower limit value as the required amount of cursor operation in the receiver 111. In the following description, the arrangement density of the item images GI arranged in the direction of movement of the cursor CUR from one item image GI selected with the cursor CUR among the item images GI-1 to GI-9 will be simply referred to as an "arrangement density of the item images GI arranged in the direction of movement of the cursor CUR."

Figure 5:
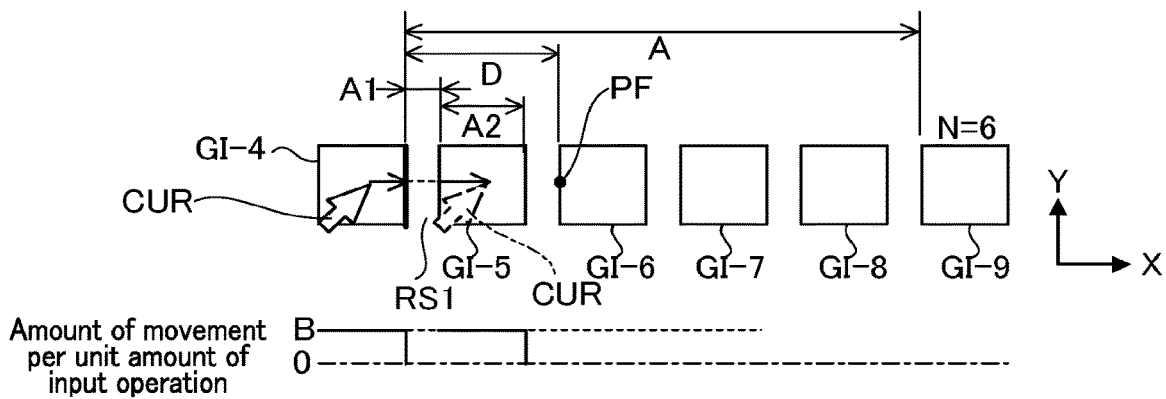
FIG. 5 is a diagram for explaining a case in which there is another item image in a direction of movement of a cursor with respect to a selected item image.

FIG. 5 is a diagram for describing a case in which the cursor CUR moves from one selected item image GI-4 to another item image GI-5. In the case illustrated in FIG. 5, since there is another item image GI-5 within the predetermined distance D from the item image GI-4, the other item image GI-5 being in the direction of movement of the cursor CUR (positive direction of X), the result of determination made by the determiner 113 is affirmative. Therefore, as in the above case illustrated in FIG. 4, the controller 112 causes the cursor CUR to skip over the region RS1 and move to the inside of the item image GI-5. However, in the case illustrated in FIG. 5, compared to the above case illustrated in FIG. 4, the arrangement density of the item images GI arranged in the direction of movement of the cursor CUR from the selected item image GI is higher. Therefore, compared to the case illustrated in FIG. 4, the controller 112 reduces the required amount of cursor operation in the receiver 111.

The controller 112 preferably sets the amount of cursor operation in the receiver 111, which is required for the user U to move the cursor CUR from the one item image GI to the other item image GI, to be within a predetermined range with respect to the amount of the cursor operation required for the following: the cursor CUR to move by the same distance as a distance by which the user U moves the cursor from the one item image GI to the other item image GI in the region RS other than the item images GI-1 to GI-9. In this case, a feeling of input operation when the cursor CUR is moved between the item images GI is made similar to a feeling of input operation when the cursor CUR is moved in the region RS. As a result, even if these cases are switched, a feeling of discomfort felt by the user U is reduced.

In this regard, the following case is assumed. First, a distance between one item image GI out of the item images GI-1 to GI-9 and the item image GI at the furthest position in the direction of movement of the cursor CUR is set as "A." Second, the number of item images GI arranged in the direction of movement of the cursor CUR from the one item image GI out of the item images GI-1 to GI-9 is set as "N". In this case, the controller 112 preferably sets the amount of cursor operation in the receiver 111 required for the user U to move the cursor CUR from the one item image GI to the other item image GI to be within a predetermined range (for example, within a range of 0.8 times or more and 1.2 times or less) with respect to the amount of the cursor operation required for the user U to move the cursor CUR by a distance of A/(N−1) in the region RS other than the item images GI-1 to GI-9.

Another case is assumed as follows. First, a distance between one item image GI selected with the cursor CUR and another item image GI adjacent to the one item image GI in the direction of movement of the cursor CUR is set as A1. Second, the length of the other item image GI in the direction of movement of the cursor CUR is set as A2. In this case, the controller 112 preferably sets the amount of cursor operation in the receiver 111 required for the user U to move the cursor CUR from the one item image GI to the other item image GI to be within a predetermined range (for example, within a range of 0.8 times or more and 1.2 times or less) with respect to the amount of the cursor operation required for the user U to move the cursor CUR by a distance of (A1+A2/2) in the region RS other than the item images GI-1 to GI-9.

The case in which the cursor CUR moves between two adjacent item images GI has been described above. The case in which the cursor CUR moves between two other adjacent item images GI is the same as the above case illustrated in FIG. 4 or FIG. 5.

Figure 6:
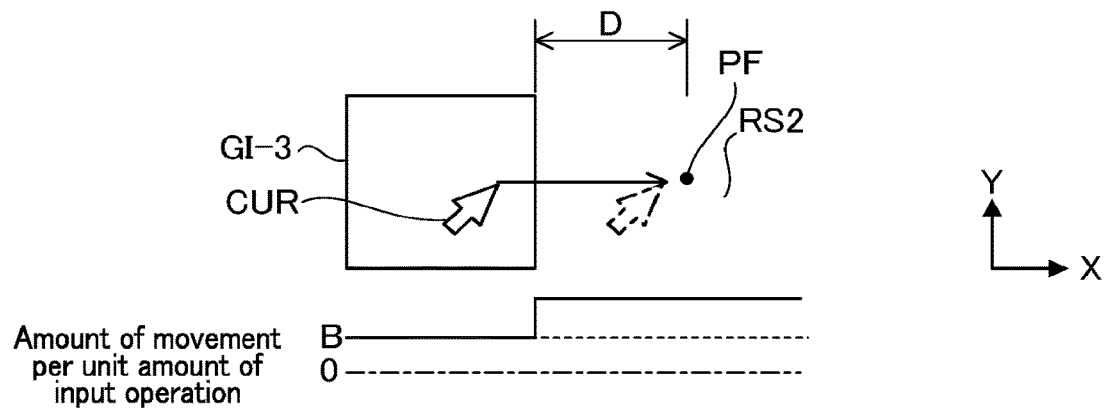
FIG. 6 is a diagram for explaining a case in which there is not another item image in a direction of movement of a cursor with respect to a selected item image.

FIG. 6 is a diagram for explaining a case in which the cursor CUR moves from the selected item image GI-3 to the region RS other than the item images GI-1 to GI-9. In the case illustrated in FIG. 6, since there is not another item image GI within the predetermined distance D from the item image GI-3 in the direction of movement of the cursor CUR (positive direction of X), the result of determination made by the determiner 113 is negative. When the result of determination made by the determiner 113 is negative, as illustrated in FIG. 6, the controller 112 causes the cursor CUR to continuously move from the inside to the outside (that is, the region RS) of the item image GI-3. In the region RS, the controller 112 causes the cursor CUR to continuously move to a desired position. The case in which the controller 112 causes the cursor CUR to move from another item image GI to the region RS is the same as the above case illustrated in FIG. 6.

When the cursor CUR is positioned inside one item image GI out of the item images GI-1 to GI-9, compared to when the cursor CUR is positioned in the region RS other than the item images GI-1 to GI-9, the controller 112 of the embodiment reduces an amount of movement of the cursor CUR per amount of the cursor operation indicated by the operation information received by the receiver 111 (hereinafter referred to as a "movement amount of the cursor CUR per unit input operation amount"). More specifically, the controller 112 has a low speed mode and a high speed mode, and it can selectively switch the mode to one of these modes based on the operation information from the receiver 111. The low speed mode refers to a mode in which the movement amount of the cursor CUR per unit input operation amount is a first movement amount. The high speed mode refers to a mode in which the movement amount of the cursor CUR per unit input operation amount is a second movement amount, which is greater than the first movement amount. In this manner, when the movement amount of the cursor CUR per unit input operation amount is made different between the inside of the item image GI and the outside of the item image GI, it is possible to provide the user U with a feeling of input operation in which it is difficult to separate the cursor CUR from the selected one item image GI. Alternatively, it is possible to quickly move the cursor CUR in the region RS. The movement amount of the cursor CUR per unit input operation amount may be constant.

When the cursor CUR is positioned in the region RS, the controller 112 changes the amount of movement of the cursor CUR per amount of the cursor operation indicated by the operation information received by the receiver 111 depending on the position between (i) the cursor CUR, and (ii) the item image GI out of the item images GI-1 to GI-9, the item image GI being in the direction of movement of the cursor CUR. In this case, compared to when the movement amount of the cursor CUR per unit input operation amount is constant, the operability of the cursor CUR is improved. For example, when the item image GI in the direction of movement of the cursor CUR is farther from the cursor CUR, the movement amount of the cursor CUR per unit input operation amount with respect to the receiver 111 is set to be larger. Therefore, the user U can make a quick and accurate move of the cursor CUR to the desired item image GI.

Regardless of whether the cursor CUR is inside the item image GI, the controller 112 preferably performs control to increase the movement amount of the cursor CUR per input operation amount of the cursor operation as the cursor operation in the receiver 111 is faster (as the degree of the amount of input operation indicated by the operation information received by the receiver 111 increases). The control is incorporated as, for example, setting of each of the above low speed mode and high speed mode. According to the control, when the cursor operation in the receiver 111 is set to be fast, even if a distance between the item image GI to be selected and the cursor CUR is longer, the user U can make a quick move of the cursor CUR to the item image GI. When the cursor operation in the receiver 111 is set to be slow, a delicate input operation of the cursor CUR is realized.

The controller 112 of the embodiment can set the amount of movement of the cursor CUR per amount of the cursor operation in the receiver 111 for each user U. The controller 112 determines the amount of movement of the cursor CUR per amount of the cursor operation in the receiver 111 based on the measurement information D1. The measurement information D1 relates to a movable distance LM of the hand H of the user U. That is, the measurement information D1 relates to a range in which the user U is able to move the hand H at a certain position. The measurement information D1 is obtained by measurement in the measurer 115. The measurer 115 images the user U using the imaging device 30 and generates the measurement information D1 based on the imaging result. Measurement by the measurer 115 is performed by, for example, appropriately executing a mode for the measurement before the above item image GI is displayed.

Figure 7:
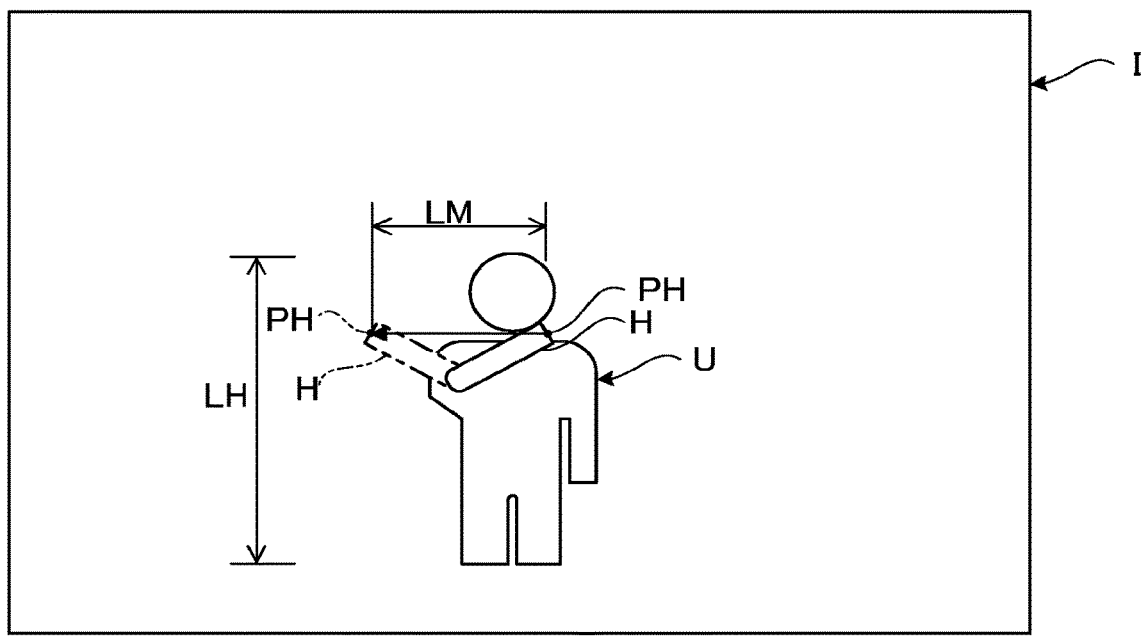
FIG. 7 is a diagram illustrating a captured image used for measurement by a measurer.

FIG. 7 is a diagram illustrating a captured image I used for measurement by the measurer 115. As illustrated in FIG. 7, the measurer 115 images the user U using the imaging device 30 to obtain the captured image I. Then, for example, the measurer 115 receives operation information corresponding to cursor operation performed by the user U from the captured image I as in the above receiver 111 and generates the measurement information D1 based on the operation information. In this case, although not illustrated, for example, an instruction such as "Move your hand H to a great extent" is displayed on the display 20. The measurement information D1 generated by the measurer 115 is stored in the storage device 12. As described above, the controller 112 determines the amount of movement of the cursor CUR per amount of the cursor operation in the receiver 111 based on the measurement result of the measurer 115. Therefore, a feeling of input operation is optimized for each user U. The measurer 115 may estimate a height LH of the user U from the captured image I and generate the measurement information D1 based on the height LH. The measurement information D1 may be stored in the storage device 12 using the input device 14 or the like without using the measurer 115.

1.4. Operation of Information Processing Apparatus

Figure 8:
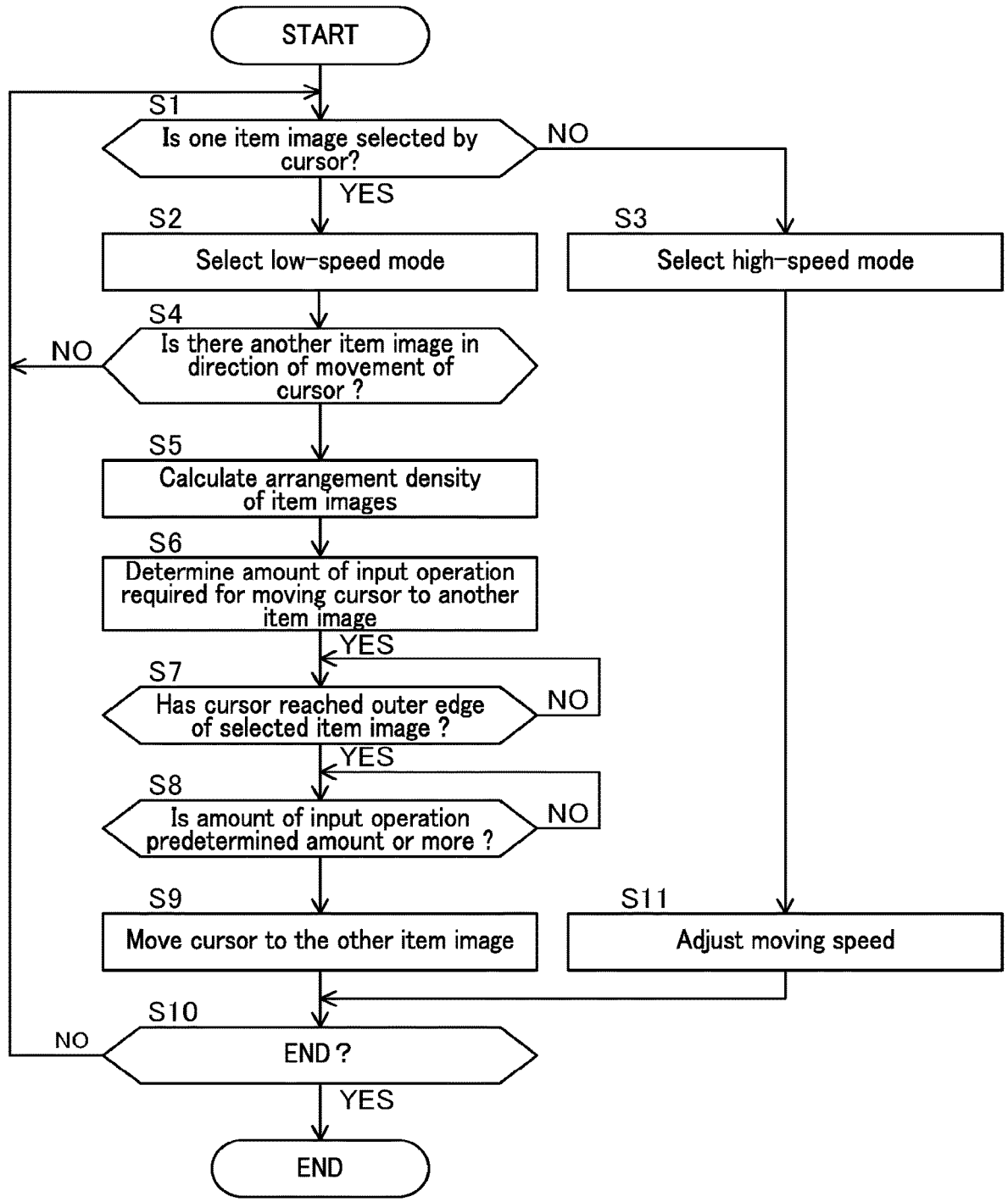
FIG. 8 is a flowchart illustrating operations of the information processing apparatus according to the first embodiment.

FIG. 8 is a flowchart illustrating operations of the information processing apparatus 10 according to the first embodiment. A flow of movement control of the cursor CUR will be described below with reference to FIG. 8. As illustrated in FIG. 8, first, the determiner 113 determines whether one item image GI among the item images GI-1 to GI-9 is selected with the cursor CUR (S1). When the result of determination at Step S1 is affirmative, the controller 112 selects a low speed mode (S2). On the other hand, when the result of determination at Step S1 is negative, the controller 112 selects a high speed mode (S3).

After Step S2, the determiner 113 determines whether there is another item image GI within the predetermined distance D from the selected item image GI, the other item image GI being in the direction of movement of the cursor CUR (S4). When there is not another item image GI within the predetermined distance D, the process return to the above Step S1.

When there is another item image GI within the predetermined distance D, the calculator 114 calculates the arrangement density of the item images GI arranged in the direction of movement of the cursor CUR (S5). Then, the controller 112 determines the amount of the cursor operation in the receiver 111 required for moving the cursor CUR from one selected item image GI-1 to another adjacent item image GI-2 based on the calculation result of the calculator 114 (S6).

Next, the controller 112 determines whether the cursor CUR has reached the outer edge of the selected item image GI (S7). This Step S7 is repeated before the cursor CUR reaches the outer edge of the selected item image GI.

When the cursor CUR reaches the outer edge of the selected item image GI, the determiner 113 determines whether the amount of input operation indicating the degree of the cursor operation in the receiver 111 is a predetermined amount or more based on the amount of input operation determined in the above Step S6 (S8). This Step S8 is repeated until the amount of input operation is greater than or equal to a predetermined amount or more.

When the amount of input operation is a predetermined amount or more, the result of determination made by the determiner 113 is affirmative, and the controller 112 causes the cursor CUR to move to another item image GI adjacent to the selected item image GI in the direction of movement (S9). Then, the controller 112 determines whether there is an end instruction (S10). When there is no end instruction, the process return to the above Step S1. On the other hand, when there is an end instruction, the series of processes end.

After the above Step S3, the controller 112 adjusts the amount of movement of the cursor CUR per unit amount of input operation, based on the position of the item image GI in the direction of movement of the cursor CUR (S11). Then, the process transitions to the above Step S10.

2. Second Embodiment

A second embodiment of the present invention will be described below. In the following exemplary embodiment, components having the same operations and functions as those in the first embodiment will be denoted with the same reference numerals used in the description of the first embodiment, and detailed descriptions thereof will be appropriately omitted.

Figure 9:
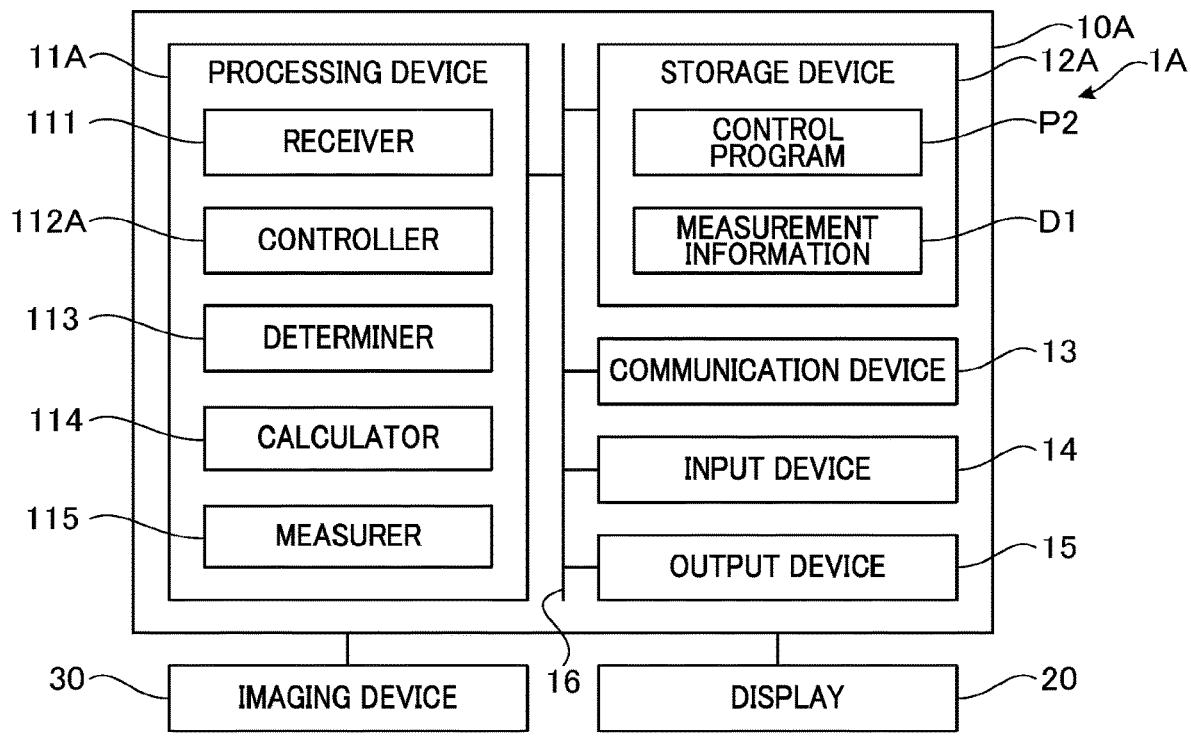
FIG. 9 is a block diagram illustrating a system using an information processing apparatus according to a second embodiment.

FIG. 9 is a block diagram illustrating a system 1A using an information processing apparatus 10A according to the second embodiment. The system 1A and the information processing apparatus 10A illustrated in FIG. 9 are the same as those in the above first embodiment except that a control program P2 is used in place of the above control program P1. A processing device 11A included in the information processing apparatus 10A functions as the receiver 111, a controller 112A, the determiner 113, the calculator 114, and the measurer 115 by executing the control program P2 read from a storage device 12A. Therefore, the information processing apparatus 10A includes the receiver 111, the controller 112A, the determiner 113, the calculator 114, and the measurer 115.

Figure 10:
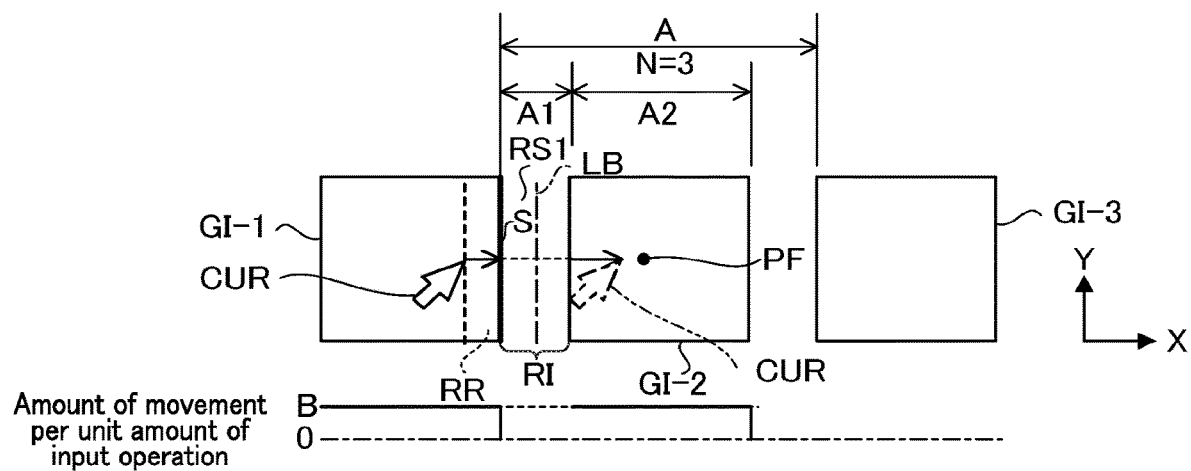
FIG. 10 is a diagram for explaining a case in which there is another item image in a direction of movement of a cursor with respect to a selected item image in the second embodiment.

FIG. 10 is a diagram for explaining a case in which there is another item image GI-2 in the direction of movement of the cursor CUR with respect to the selected item image GI-1 in the second embodiment. In the following description, a case will be described in which the cursor CUR moves between the item image GI-1 and the item image GI-2. The same applies to a case in which the cursor CUR moves between two other adjacent item images GI. In the case illustrated in FIG. 10, in the direction of movement of the cursor CUR (positive direction of X), the item image GI-2 is present as another item image GI within the predetermined distance D from the item image GI-1. Therefore, the result of determination made by the determiner 113 is affirmative. When the result of determination made by the determiner 113 is affirmative, the controller 112A provides a deceleration region RR inside the selected item image GI-1. When the determination result of the determiner 113 is negative, it is the same as in the above first embodiment.

The deceleration region RR of the embodiment is provided in a region on the right side with respect to the dotted line in FIG. 10 inside the item image GI-1 with a predetermined width along the side S of the item image GI-1. The deceleration region RR refers to a region in which the amount of movement of the cursor CUR per amount of the cursor operation in the receiver 111 decreases. The degree of decrease (deceleration) is determined according to the width or size of the deceleration region RR, and is not particularly limited, but may be, for example, within a range of 20% or more and 80% or less during a normal period (a reference value B).

The controller 112A determines deceleration of the above deceleration region RR based on the result of calculation made by the calculator 114. In this manner, the controller 112A adjusts the amount of cursor operation in the receiver 111 required for the user U to move the cursor CUR from one selected item image GI-1 to another adjacent item image GI-2 based on the result of calculation made by the calculator 114. More specifically, the controller 112A decreases the deceleration of the deceleration region RR as the arrangement density calculated by the calculator 114 increases. According to this control, the controller 112A reduces the required amount of cursor operation in the receiver 111.

Before the cursor CUR reaches the deceleration region RR, the controller 112A of the embodiment causes the cursor CUR to move according to the amount of input operation with respect to the receiver 111 using the amount of movement of the cursor CUR per amount of the cursor operation in the receiver 111 as the reference value B. Then, when the cursor CUR reaches the deceleration region RR, the controller 112A reduces the amount of movement of the cursor CUR per amount of the cursor operation in the receiver 111 below the reference value B. Therefore, it is possible to provide the user U with a feeling of input operation in which it is difficult to separate the cursor CUR from the selected item image GI-1. In the present embodiment, since the deceleration region RR is provided in a part of the item image GI-1 along the outer circumference of the item image GI-1, it is possible to prevent the cursor CUR from being too difficult to separate from the item image GI-1. When the cursor CUR reaches the outer edge of the item image GI-1, the controller 112A removes the deceleration region RR from the item image GI-1.

An acceleration region RI is provided in the region RS1 between the item image GI-1 and the item image GI-2 in the present embodiment. In FIG. 10, a case in which the acceleration region RI is provided over the entire region RS1 is exemplified. The acceleration region RI refers to a region in which the amount of movement of the cursor CUR per amount of the cursor operation in the receiver 111 is greater than the reference value B. When the cursor CUR reaches the acceleration region RI, the controller 112A increases the amount of movement of the cursor CUR per amount of the cursor operation in the receiver 111 above the reference value B. Therefore, it is possible to provide the user U with a feeling of input operation in which the cursor CUR sticks to the item image GI-2.

The controller 112A of the embodiment provides a boundary line LB between the item image GI-1 and the item image GI-2. In FIG. 10, the boundary line LB is provided at an intermediate position between the item image GI-1 and the item image GI-2. Then, when the cursor CUR is in the region between the boundary line LB and the item image GI-1, the controller 112A determines that the item image GI-1 is selected with the cursor CUR. On the other hand, when the cursor CUR is in the region between the boundary line LB and the item image GI-2, the controller 112A determines that the item image GI-2 is selected with the cursor CUR. Therefore, it is possible to avoid a case in which neither of the item images GI-1 and GI-2 is selected with the cursor CUR. Since the item images GI are arranged apart from each other, compared to when the item images GI are arranged in contact with each other, it is easy for the user U to visually understand which of the item images GI-1 and GI-2 is selected with the cursor CUR. The boundary line LB may be unevenly distributed at a position closer to the item image GI-1 than the intermediate position between the item image GI-1 and the item image GI-2 or may be unevenly distributed at a position closer to the item image GI-2. In FIG. 10, the boundary line LB is a straight line parallel to the Y direction, but the boundary line LB may have a curved part or a bent part. Alternatively, the boundary line LB may have a part inclined relative to the Y direction. The boundary line LB may be provided as necessary or may be omitted.

Figure 11:
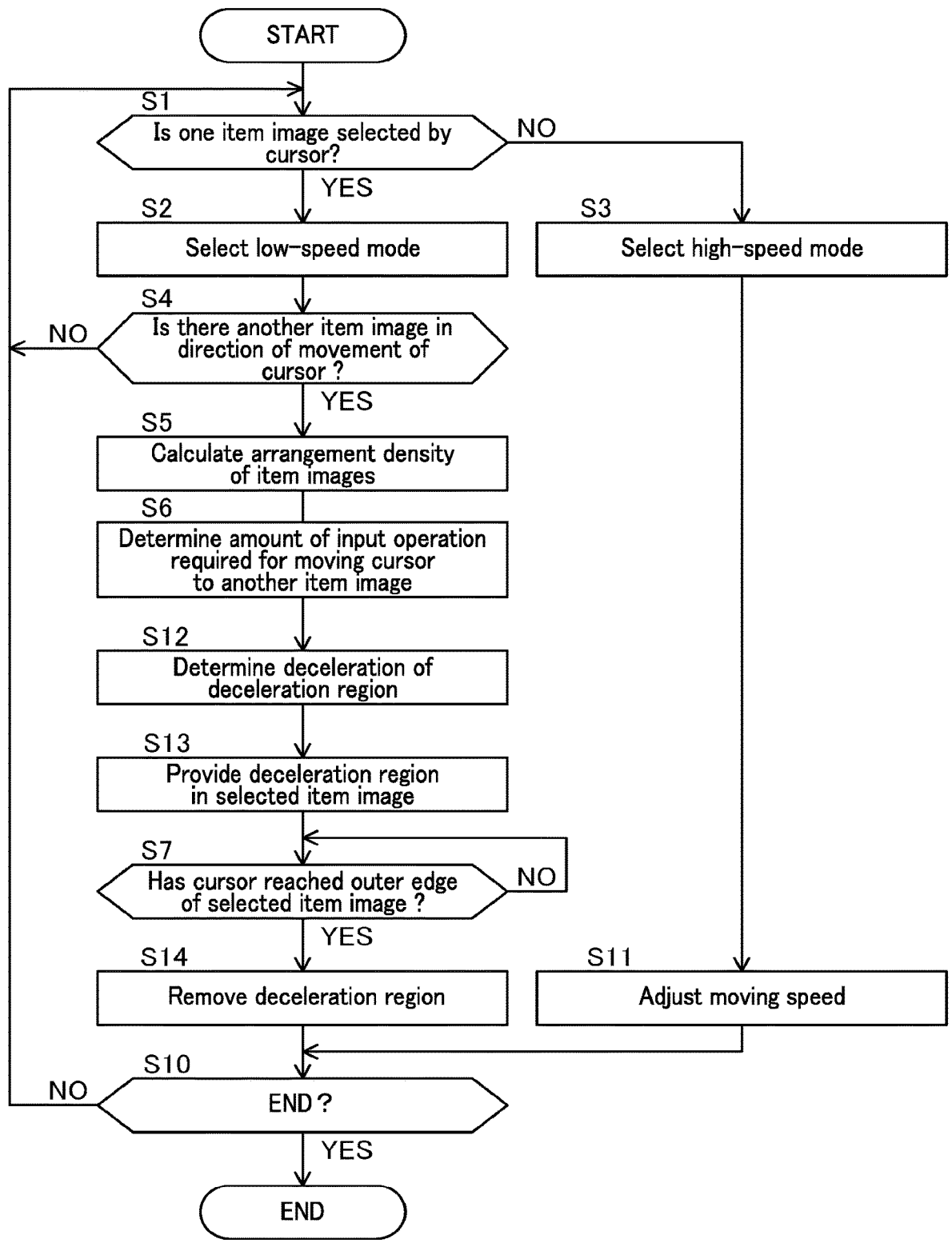
FIG. 11 is a flowchart illustrating operations of the information processing apparatus according to the second embodiment.

FIG. 11 is a flowchart illustrating operations of the information processing apparatus 10A according to the second embodiment. A flow of movement control of the cursor CUR will be described below with reference to FIG. 11. As illustrated in FIG. 11, in the embodiment, as in the above first embodiment, the processes of Steps S1 to S6, S10 and S11 are executed.

After Step S6, the controller 112A determines deceleration of the deceleration region RR based on the amount of input operation determined in the above Step S6 (S12). Then, the controller 112A provides the deceleration region RR in the selected item image GI (S13). Then, the controller 112A determines whether the cursor CUR has reached the outer edge of the selected item image GI (S7). This Step S7 is repeated before the cursor CUR reaches the outer edge of the selected item image GI.

When the cursor CUR reaches the outer edge of the selected item image GI, the controller 112A removes the deceleration region RR (S14). Then, the controller 112A determines whether there is an end instruction (S10). When there is no end instruction, the process returns to the above Step S1. On the other hand, when there is an end instruction, the series of processes ends.

3. Modifications

The present invention is not limited to the embodiments exemplified above. Specific modifications will be described below. Two or more modes freely selected from the following examples may be combined.

(1) In the above embodiments, a configuration in which the display 20 and the imaging device 30 are separated from the information processing apparatus 10 has been exemplified. However, the present invention is not limited to this configuration. For example, one or both of the display 20 and the imaging device 30 may be integrated with the information processing apparatus 10.

Figure 12:
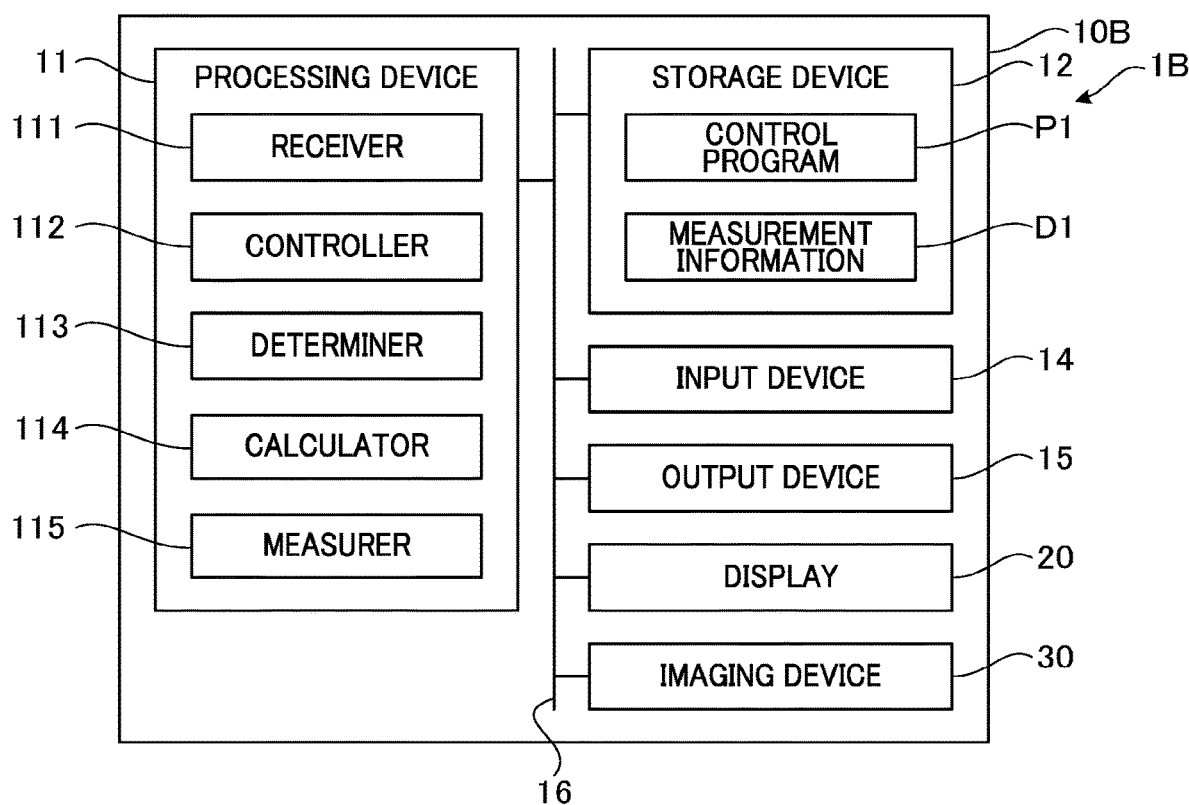
FIG. 12 is a block diagram illustrating a system using an information processing apparatus according to a modified example.

FIG. 12 is a block diagram illustrating a system 1B using an information processing apparatus 10B according to a modified example. In the system 1B illustrated in FIG. 12, the information processing apparatus 10B, the display 20 and the imaging device 30 are integrated. The display 20 and the imaging device 30 are communicatively connected to the bus 16 of the information processing apparatus 10B. In the information processing apparatus 10B, the communication device 13 of the above embodiment is omitted.

(2) In the above embodiments, a configuration of the information processing apparatus is exemplified in which the receiver 111 receives an input operation using a gesture of the user U. However, the present invention is not limited to this configuration. For example, the receiver 111 may receive the input operation made by the user U using a pointing device, such as a mouse. However, regarding the input operation using the gesture of the user U, a delicate input operation is generally difficult compared to the input operation using a pointing device such as a mouse. Therefore, when the receiver 111 receives the input operation using the gesture, the effects obtained by applying the present invention are particularly significant.

(3) The block diagram used in the description of the above embodiments shows blocks of functional units. These functional blocks (components) are realized by a freely selected combination of hardware and/or software. Units for realizing functional blocks are not particularly limited.

That is, the functional blocks may be realized by one device that is physically and/or logically linked or may be realized by connecting two or more physically and/or logically separated devices in a direct and/or indirect manner (for example, a wired and/or wireless manner) and using these devices. The term "device" used in the description of the above embodiments may be replaced with another term such as a circuit, a device or a unit.

(4) As long as there is no conflict, the orders of processing procedures, sequences, flowcharts and the like in the above embodiments may be changed. For example, in the method described in this specification, components of various steps in an exemplary order are presented. However, the present invention is not limited to the presented specific order.

(5) In the above embodiments, input and output information and the like may be stored in a specific device (for example, a memory). The input and output information and the like may be overwritten, updated, or added. The output information and the like may be deleted. The input information and the like may be transmitted to another device.

(6) In the above embodiments, the determination may be performed using a value (0 or 1) represented by 1 bit, may be performed using a Boolean variable (Boolean: true or false), or may be performed by comparing numerical values (for example, comparison with a predetermined value).

(7) In the above embodiments, a case in which the storage device 12 is a recording medium that can be read by the processing device 11 and is, for example, a ROM or a RAM has been exemplified, but a flexible disk, a magneto-optical disk (for example, a compact disk, a digital versatile disk, a Blu-ray (registered trademark) disk), a smart card, a flash memory device (for example, a card, a stick, a key drive), a compact disc-ROM (CD-ROM), a register, a removable disk, a hard disk, a floppy (registered trademark) disk, a magnetic strip, a database, a server, and other suitable storage mediums may be used. The program may be transmitted via a network. The program may be transmitted through a telecommunication line via a communication network.

(8) In the above embodiments, the described information, signals and the like may be represented using any of various different technologies. For example, data, instructions, commands, information, signals, bits, symbols, chips and the like referred to throughout the entire description above may be represented by voltages, currents, electromagnetic waves, magnetic fields or magnetic particles, optical fields or photons, or freely selected combinations thereof.

(9) The functions exemplified in FIG. 2 are realized by a freely selected combination of hardware and software. In addition, the functions may be realized by a single device or be realized by two or more devices that are separated from each other.

(10) Regardless of whether the program exemplified in the above embodiments is called software, firmware, middleware, a microcode, a hardware description language, or any other term, it should be broadly interpreted to mean instructions, instruction sets, codes, code segments, program codes, subprograms, software modules, applications, software applications, software packages, routines, subroutines, objects, executable files, execution threads, procedures, functions or the like. Software, instructions and the like may be transmitted and received via a transmission medium. For example, when software is transmitted from websites, servers, or other remote sources using wired technologies such as coaxial cables, fiber optic cables, twisted pairs and digital subscriber lines (DSL) and/or wireless technologies such as infrared rays, radio waves and microwaves, these wired technologies and/or wireless technologies are included in the definition of the transmission medium.

(11) In the above embodiments, information, parameters and the like may be represented by an absolute value, represented by a relative value with respect to a predetermined value, or may be represented by other corresponding information. For example, radio resources may be indexed.

(12) The above embodiments include a case in which the information processing apparatus 10 is a mobile station. The mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

(13) In the above embodiments, the term "connected" or any modification thereof means any direct or indirect connection or link between two or more components, and can include a case in which there are one or more intermediate components between two components "connected" to each other. The connection between components may be physical or logical, or a combination thereof. Two components used in this specification can be considered to be "connected" to each other by using one or more wires, cables and/or printed electrical connections or, as some non-limiting and non-exhaustive examples, by using electromagnetic energy such as electromagnetic energy having wavelengths in a radio frequency range, a microwave range and a light (both visible and invisible) range.

(14) In the above embodiments, the description "based on" does not mean "based only on" unless otherwise specified. In other words, the description "based on" means both "based only on" and "based at least on."

(15) Any reference to components using the terms "first" and "second" used in this specification does not generally limit the amount or order of these components. These terms may be used in this specification as a convenient method of distinguishing two or more components. Therefore, references to first and second components do not mean that only two components may be used here, or that the first component must precede the second component in any form.

(16) As long as "including," "comprising", and modifications thereof in the above embodiments are used in this specification or the scope of the claims, these terms are intended to be inclusive, as the term "containing." The term "or" used in this specification or the scope of the claims is not intended to be an exclusive OR.

(17) Throughout this specification, for example, when articles like "a," "an," and "the" in English are added in translation, these articles may also indicate multiple components, unless the context clearly indicates otherwise.

(18) It will be apparent to those skilled in the art that the present invention is not limited to the embodiments described herein. The present invention can be implemented as modified and with changed modes without departing from the spirit and scope of the present invention as defined based on the scope of the claims. Therefore, the description of this specification is for the purpose of exemplary description and does not have any restrictive meaning for the present invention. In addition, many aspects selected from the aspects exemplified in this specification may be combined.

DESCRIPTION OF REFERENCE SIGNS 1, 1A and 1B . . . System
10, 10A and 10B . . . Information processing apparatus
20 . . . Display
111 . . . Receiver
112 and 112A . . . Controller
113 . . . Determiner
114 . . . Calculator
115 . . . Measurer
CUR . . . Cursor
D . . . Predetermined distance
GI . . . Item image
GI-1, GI-2, GI-3, GI-4 and GI-5 . . . Item image
H . . . Hand
L1 . . . Distance
LB . . . Boundary line LM . . . Distance
RR . . . Deceleration region
RS, RS1 and RS2 . . . Region
U . . . User

The invention claimed is:

1. An information processing apparatus that displays item images and a cursor on a display, the information processing apparatus comprising:
processing circuitry configured to receive operation information corresponding to details of a cursor operation of allowing a user to move the cursor;
cause the display to display the cursor, based on the operation information;
when the operation information includes an instruction to move the cursor positioned in one item image out of the item images toward another item image adjacent to the one item image, calculate an arrangement density indicative of a number of item images per a unit length arranged in a direction of movement of the cursor from the one item image;
set an amount of the cursor operation for the user to move the cursor from the one item image to the another item image, to be within a predetermined range with respect to an amount of the cursor operation for moving the cursor in a region other than the item images by a same distance as a distance by which the user moves the cursor from the one item image to the another item image; and
reduce an amount of the cursor operation required for the user to move the cursor from the one item image to the another item image to be within a range not below a predetermined lower limit value as the calculated arrangement density increases,
wherein
when the operation information includes an instruction to move the cursor from an inside to an outside of the one item image, the processing circuitry is configured to determine whether there is the another item image within a predetermined distance in a direction of movement of the cursor from the one item image;
when a result of the determination is affirmative, the processing circuitry is configured to provide, inside the one item image, a deceleration region in which an amount of movement of the cursor per amount of the cursor operation decreases,
when the result of the determination is negative, the processing circuitry is configured not to provide, inside the one item image, the deceleration region, and
wherein the predetermined distance is within a range of 0.8 times the amount of cursor operation or more and 1.2 times the amount of cursor operation or less.

2. The information processing apparatus according to claim 1, wherein the processing circuitry causes the cursor to skip over a region between the one item image and the another item image and move to an inside of the another item image.

3. The information processing apparatus according to claim 1, wherein:
the processing circuitry is configured to provide a boundary line between the one item image and the another item image,
when the cursor is positioned in a region between the boundary line and the one item image, the processing circuitry is configured to determine that the one item image is selected with the cursor, and
when the cursor is positioned in a region between the boundary line and the another item image, the processing circuitry is configured to determine that the another item image is selected with the cursor.

4. The information processing apparatus according to claim 1, wherein as an amount of an input operation indicated by the operation information increases, the processing circuitry is configured to increase an amount of movement of the cursor per amount of the cursor operation in which the cursor is moved by the user.

5. The information processing apparatus according to claim 1, wherein the processing circuitry is configured to receive the operation information based on data from an imaging device that detects a gesture of the user.

6. The information processing apparatus according to claim 5, wherein the processing circuitry is configured to measure a range in which the hand of the user is movable, and
wherein the processing circuitry is configured to determine an amount of movement of the cursor per amount of the cursor operation, based on a measurement result of the measured range.

7. A method, implemented by processing circuitry of an information processing apparatus that displays item images and a cursor on a display, comprising:
receiving operation information corresponding to details of a cursor operation of allowing a user to move the cursor;
causing the display to display the cursor, based on the operation information;
when the operation information includes an instruction to move the cursor positioned in one item image out of the item images toward another item image adjacent to the one item image, calculating an arrangement density indicative of a number of item images per a unit length arranged in a direction of movement of the cursor from the one item image;
setting an amount of the cursor operation for the user to move the cursor from the one item image to the another item image, to be within a predetermined range with respect to an amount of the cursor operation for moving the cursor in a region other than the item images by a same distance as a distance by which the user moves the cursor from the one item image to the another item image;
reducing an amount of the cursor operation required for the user to move the cursor from the one item image to the another item image to be within a range not below a predetermined lower limit value as the calculated arrangement density increases,
wherein
when the operation information includes an instruction to move the cursor from an inside to an outside of the one item image, the method includes determining whether there is the another item image within a predetermined distance in a direction of movement of the cursor from the one item image,
when a result of the determination is affirmative, the method includes providing, inside the one item image, a deceleration region in which an amount of movement of the cursor per amount of the cursor operation decreases,
when the result of the determination is negative, the method includes providing, inside the one item image, the deceleration region, and
wherein the predetermined distance is within a range of 0.8 times the amount of cursor operation or more and 1.2 times the amount of cursor operation or less.

* * * * *